(12) United States Patent
Kehiaian et al.

(10) Patent No.: US 12,427,625 B2
(45) Date of Patent: Sep. 30, 2025

(54) ABRASIVE BLAST TREATMENT MACHINE FOR SURFACES OF LARGE-SCALE WORKPIECES

(71) Applicant: SCITEEX SP. Z O. O., Warsaw (PL)

(72) Inventors: Armand Kehiaian, Warsaw (PL); Kamil Jagodziński, Warsaw (PL)

(73) Assignee: SCITEEX SP. Z O.O., Warsaw (PL)

( * ) Notice: Subject to any disclaimer, the term of this patent is extended or adjusted under 35 U.S.C. 154(b) by 921 days.

(21) Appl. No.: 17/421,698

(22) PCT Filed: Jan. 9, 2020

(86) PCT No.: PCT/IB2020/050143
§ 371 (c)(1),
(2) Date: Jul. 8, 2021

(87) PCT Pub. No.: WO2020/144613
PCT Pub. Date: Jul. 16, 2020

(65) Prior Publication Data
US 2022/0097208 A1    Mar. 31, 2022

(30) Foreign Application Priority Data

Jan. 9, 2019 (PL) .......................................... 428539
Jan. 3, 2020 (PL) .......................................... 432500

(51) Int. Cl.
*B24C 3/06*        (2006.01)
*B24C 5/06*        (2006.01)
(Continued)

(52) U.S. Cl.
CPC .................. *B24C 3/06* (2013.01); *B24C 5/06* (2013.01); *B24C 7/0092* (2013.01); *B24C 9/003* (2013.01)

(58) Field of Classification Search
CPC .. B24C 3/06; B24C 3/08; B24C 3/086; B24C 3/083; B24C 3/10; B24C 3/12; B24C 7/0092; B25J 9/02
See application file for complete search history.

(56) References Cited

U.S. PATENT DOCUMENTS 4,269,003 A    5/1981    Wolfgang
5,779,524 A    7/1998    Swain

FOREIGN PATENT DOCUMENTS

CN    104 290 039    1/2015
CN    107 139 086    9/2017
(Continued)

OTHER PUBLICATIONS

CN-107139086-A translation (Year: 2017).*
(Continued)

*Primary Examiner* — Joel D Crandall
(74) *Attorney, Agent, or Firm* — Craft Chu PLLC; Andrew W. Chu

(57) ABSTRACT

The subject of the invention is an abrasive blast machine for surfaces of large-scale workpieces comprising a housing (O) constituting a working chamber, a kinematic mechanism for moving the effector, an abrasive recirculation system, an effector feeding system with recirculated abrasive, characterized in that the kinematic mechanism is a multipart kinematic mechanism (MK) with at least four-axis, and in that, the effector is an impact turbine (T), which produces the treatment tool and directs it to the workpiece.

15 Claims, 15 Drawing Sheets

Figure 1:
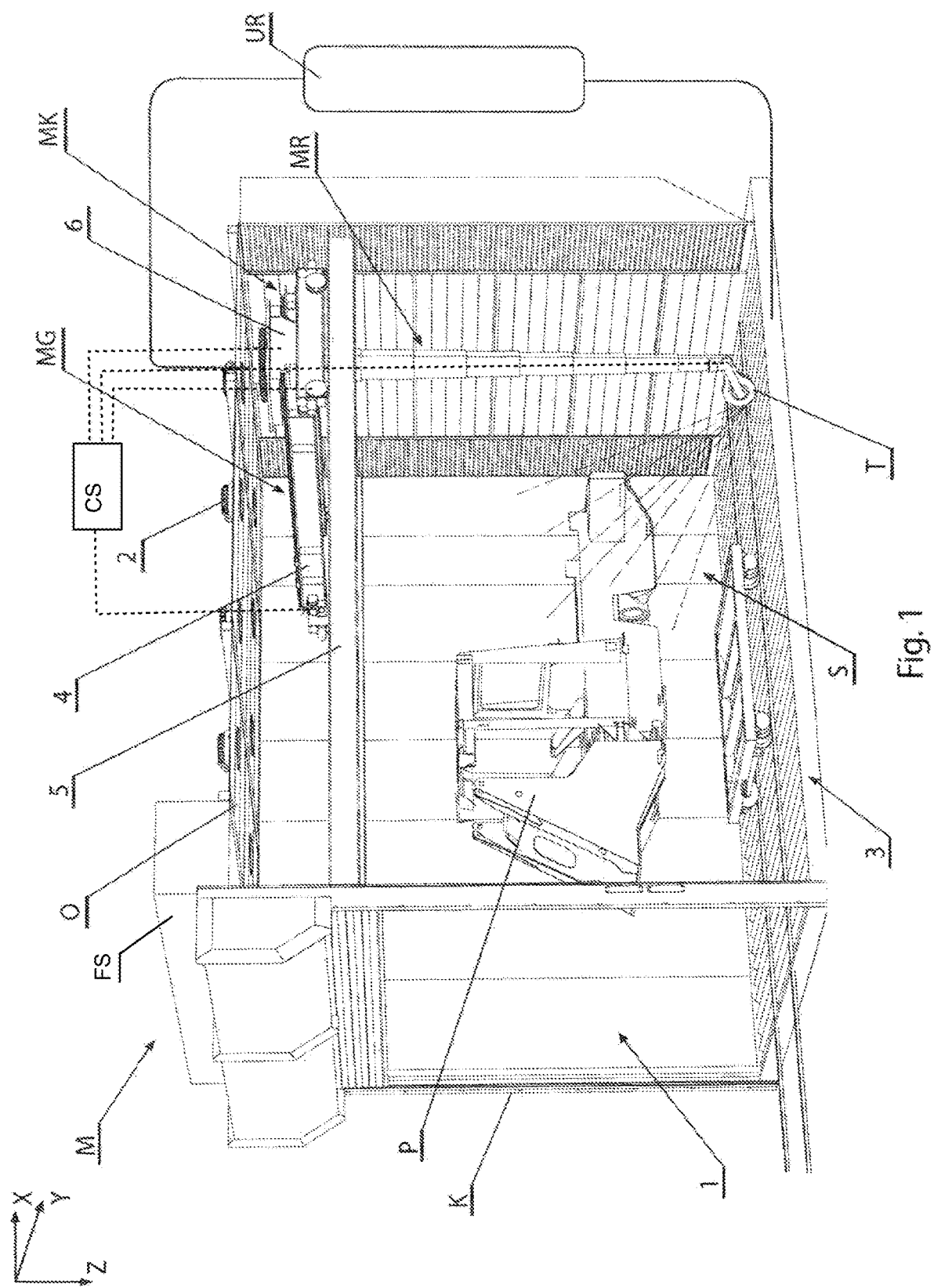

(51) Int. Cl.
*B24C 7/00* (2006.01)
*B24C 9/00* (2006.01)

(56) References Cited

FOREIGN PATENT DOCUMENTS

| CN | 107139086 A | * | 9/2017 |
|----|----|----|----|
| DE | 35 23 647 | | 2/1986 |
| JP | 2006 035347 | | 2/2006 |
| JP | 2006035347 A | * | 2/2006 |
| SE | 457 778 | | 1/1989 |
| WO | 1986/04289 | | 7/1986 |

OTHER PUBLICATIONS

JP-2006035347-A translation (Year: 2006).*
The International Search Report (ISR) with Written Opinion for PCT/IB2020/050143 dated Jul. 7, 2020, pp. 1-18.

* cited by examiner

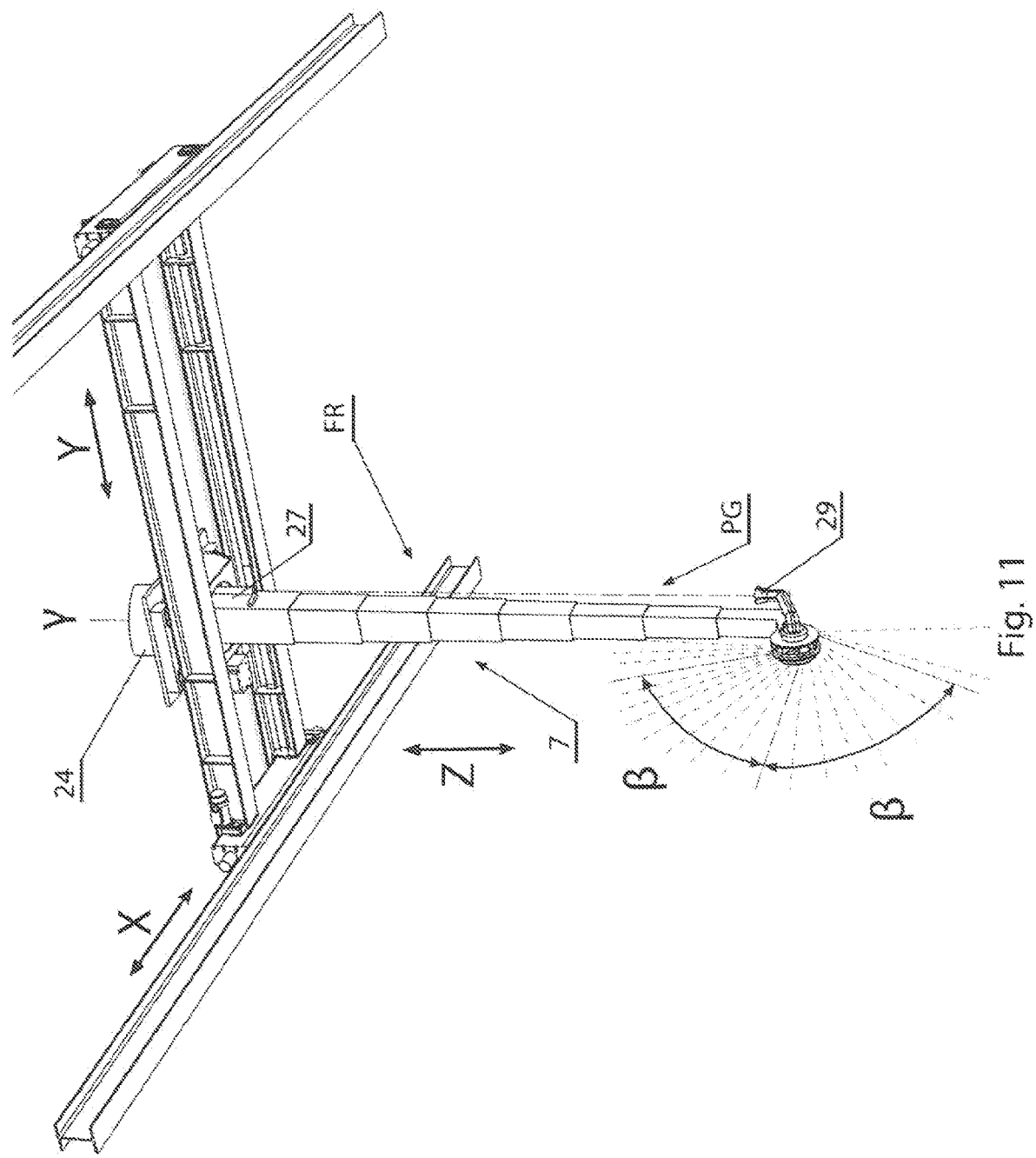

ABRASIVE BLAST TREATMENT MACHINE FOR SURFACES OF LARGE-SCALE WORKPIECES

CROSS REFERENCE TO RELATED APPLICATION

This application is a U.S. National Phase of International Application No. PCT/IB2020/050143, filed on Jan. 9, 2020, which claims priority to Poland Patent Application No. PL432500, filed Jan. 3, 2020 and Poland Patent Application No. PL428539, filed Jan. 9, 2019, all of which are incorporated by reference herein in their entirety.

The object of the invention relates to an abrasive blast treatment machine for surfaces of large-scale workpieces.

Definitions

The term large-scale workpiece in the present description means a workpiece, wherein each of the three geometrical dimensions is at least 1000 mm and whose surfaces are subjected to abrasive blast treatment.

The term effector or end effector should be understood as an abrasive blast treatment executive system.

The term abrasive jet refers to a jet of abrasive grains having the kinetic energy provided by the end effector.

The term treatment tool refers to an abrasive jet produced by the effector, that directly affects the surface of the workpiece. Hereinafter, the terms abrasive jet and treatment tool will be used interchangeably. The hot spot is the area of the treatment tool at the point of impact with surface of the workpiece. Any changes in the kinematic parameters of the abrasive jet have an impact on the hot spot.

The term velocity vector of a treatment tool means the sum of the velocity vectors of each grain of the abrasive jet. The velocity vector determines the attachment point and the direction of the treatment tool.

The term pneumatic treatment refers to pneumatic blast treatment by a shot blasting nozzle. In the pneumatic abrasive blasting treatment technique, the kinetic energy of the abrasive is given by means of compressed air. The abrasive is ejected at a high speed from the shot blasting nozzle, which is fed by a flexible hose transporting the abrasive-air mixture (shot blasting lance).

The effector, the shot blasting nozzle, is the end of the air hose, through which the abrasive is ejected with kinetic energy. It is a type of effector used for pneumatic abrasive blast treatment. Shot blasting nozzles are usually Venturi's tubes made of abrasion resistant material. It is a type of effector used for pneumatic abrasive blast treatment.

The pneumatic blast chamber defines commonly used machines adapted for pneumatic treatment of large-scale workpieces.

The term wheel treatment refers to mechanical abrasive blast treatment by means of an impact turbine.

The effector, the impact turbine is a device driven by an electric motor, which gives the kinetic energy of the abrasive through the rotation of the impact wheel with blades. It is a type of effector used for wheel abrasive blast treatment.

The term wheel blast machine means commonly used machines designed for wheel treatment. The space, in or through which workpieces move and are exposed to the impact turbines is called the hot zone of the wheel blast machine.

The invention relates to the wheel abrasive blast treatment technique used to treatment of surfaces of large-scale workpieces. Abrasive blast treatment is a mechanical method and is used to achieve a variety of treatment effects such as removing impurities (i.e. removing rust, scale or old coatings), surface preparation (roughing) before applying protective or/and decorative metallic layers and/or organic, leveling out unevenness, refining, shaping or reinforcing the surface. Any abrasive grains or other treatment media can be used as abrasive. The abrasive blast technique is widely used in industry, both in production and renovation processes, it is used in particular for treatment of surfaces of large-scale workpieces.

In addition to wheel technology, pneumatic technology is also widely used. In pneumatic technology, kinetic energy is given by compressed air, while in wheel technology turbines are used, which produce an abrasive jet, wherein the elliptical hot spot created on the treatment surface is larger than the circular spot created by the nozzle in pneumatic technology. The air nozzle can be operated manually, wherein the movement of the air nozzle in the shot blasting chamber can be automated and carried out by robots.

Shot blasting chambers for pneumatic treatment of large-scale workpieces, known from the state of the art, contain a treatment room (working chamber) equipped with a filtration dust removal system, abrasive recirculation system, pneumatic blast machine (one or many), control system and executive system. The working chamber is a space adapted to manual operation (operators) or the manipulator, due to the high speed of abrasive ejection and the accompanying high noise intensity and dust generation. The impact of the abrasive is dispersed in the working chamber. The working chamber is a space resistant to mechanical impact of the abrasive. An example of a working chamber is a steel structure protected from the inside with rubber panels. The working chamber is equipped with access gates, service doors and lighting. An example of an abrasive recirculation system is among others floor (horizontal) abrasive transport system, vertical abrasive transport system, cleaning system (dust removal and abrasive grain size classification) and cleaned abrasive container. An example of a floor abrasive transport system are scraper bars moving in corridors. The executive system is a shot blasting nozzle (effector or end effector) fed with a loose air hose (shot blasting lance) connected to a pneumatic cleaner. The workpiece is in a fixed position and the effector is movable, inside the treatment chamber, to direct the treatment tool (abrasive jet) to selected surfaces of the workpiece. In other words, the treatment tool is movable, guided. The tool approach vector can be omnidirectional, i.e. arbitrarily directed. The variation of the speed vector module of the treatment tool can be implemented by changing the speed of the abrasive (working pressure) and changing the distance from the treated surface. The effector in the chambers is moved inside the work space.

Solutions are known, where large-scale workpieces are treated in shot blasting chambers equipped with one or more shot blasting nozzles to increase treatment efficiency. The shot blasting nozzle is movable, manually controlled by the operator holding the lance in his or her hands or in other solutions the shot blasting nozzle can be directed by means of controlled mechanisms (e.g. a robot) following or in accordance with the developed program. The workpiece can be rotated independently of the nozzle movement.

In wheel technology, the executive system (effector) is an impact turbine, which, using a combination of radial and tangential forces, gives the abrasive kinetic energy by means of a rotating wheel with blades. Inside the impact turbine body there is also a separating rotor, coaxial with an impact wheel, responsible for portioning the abrasive and providing initial direction and acceleration of the abrasive grains. The coaxial disposed control sleeve also includes an abrasive ejection window through which the abrasive is ejected. The position of this sleeve determines the ejection angle of the abrasive jet towards the workpiece.

In prior art wheel blast machines, unlike pneumatic chambers, the effector (impact turbine) is in a fixed position and the treated workpiece is set in motion so that its surfaces are exposed in front of the treatment tool (abrasive jet) produced by the effector. In other words, the treatment tool is stationary. The tool's approach vector is unidirectional. The variation of the speed vector module of the treatment tool can be implemented by changing the ejection speed (variable speed of the rotating wheel). In known wheel blast machines, the effector is installed outside the working space. In exceptional cases, the effector may have a variable angle (vector) of interaction by changing the angle in the rotor plane by changing the position of the control sleeve or changing the position of the entire turbine. In both cases, the range of motion is limited due to the fixed position of the turbine and its seating outside the treatment chamber.

EP3132895 discloses a sandblasting system comprising an impact turbine driven by an axially located drive motor. The impact turbine is mounted on the chamber, in which the cleaning takes place. The impact turbine can perform pendulum movements to a limited extent. The angle change is perpendicular to the rotor plane.

Document U.S. Pat. No. 3,604,157A discloses a surface treatment device comprising: a treatment chamber, means for transporting a workpiece having a surface to be treated inside said chamber. For cleaning, an impact turbine is used, which can perform a pendulum movement to a limited extent. The turbine is designed to access certain selected surfaces of the workpiece.

There are known solutions where the treatment of large-scale workpieces takes place in wheel blast machines, in which usually many impact turbines are installed in such a way, as to create an area of impact of the tools (abrasive jets), through which the workpiece is moved, usually rotary or linear. In this way, abrasive jets cover the surfaces of the treated workpiece in motion.

There are examples known from the state of the art, where the impact turbine is located inside the working housing on a linear axis, but this solution has a very limited range of applications.

The advantage of pneumatic blast chambers while large-scale workpieces treatment is that the treatment chambers have virtually no dimensional limitations, wherein the abrasive jest can be optimally directed to the treatment surfaces. However, the advantage of wheel blast machines is that the treatment is maintenance-free, and the process itself requires proportionally less energy to clean the same surface.

The impact turbine, due to its weight, cannot be operated manually (except for the application of a horizontal surface blast machine). For this reason, usually the treated workpiece is moved in front of the stationary turbine.

Treatment with a stationary impact turbine becomes less energy efficient when in the specified working space smaller dimensions of workpieces are treated than the nominal dimensions of the chamber allow. This is due to the fact that stationary turbines eject the abrasive in a constant, defined way and some of the material does not hit the surface of the workpiece. To reduce this unfavorable phenomenon, for smaller workpieces, such operations as switching off selected turbines or changing the ejection direction of the abrasive jet can be used, wherein this is not always possible, especially when the distance between the turbine and the workpiece is constant, which results from the turbine's stationary nature.

The limitation of manual pneumatic treatment is its energy consumption and labor intensity. Robotization of the process slightly improves the energy aspects (provided that the overlap is optimally routed between adjacent spots), but programming is very labor-intensive due to the ratio between the size of the hot spot and the size of the treated surface. The pneumatic shot blasting robot must perform a relatively long trajectory and fast movements. However, the size of the workpieces is a limitation of wheel blast treatment. This is due to the need to multiply the number of turbines in the case of large-scale workpieces and of complex shapes workpieces, which is associated with an increase in the complexity of the machine and the need to provide very high power, exceeding the machine's performance needs, non-uniform treatment parameters depending on the distance of the treated surface from the turbines, a decrease in energy efficiency and excessive abrasive consumption when workpieces smaller than nominal are treated.

It is widely recognized, that the energy efficiency of wheel blast treatment is several dozen times higher that of pneumatic treatment. The impact turbine with a relatively low energy demand, produces a treatment tool (abrasive jet) with a much larger and even impact. However, the use of impact turbines in currently known solutions is limited by their weight (they cannot be operated manually) and currently known methods of feeding the abrasive.

Among users of abrasive blasting treatment machines, there is a need for a machine equipped with an impact turbine (effector), which is moved in the working space by a kinematic mechanism and produces a treatment tool (abrasive jet) with a variable impact position.

The essence of the invention is a machine for abrasive blast treatment of the surface of large-scale workpieces, including a housing forming a working chamber, a kinematic mechanism for moving the effector, an abrasive recirculation system, an effector feeding system with recirculated abrasive, a filtration system for the working chamber and a machine control system, including a kinematic mechanism.

The machine is characterized in that the kinematic mechanism is a controlled, multi-part mechanism of at least four axes, terminated by an effector, and in that the effector is an impact turbine that produces a treatment tool and directs it to the workpiece. Thanks to this, the effector with variable position and direction of interaction produces a treatment tool (abrasive jet) optimally directed to the surface of the workpiece located in the working chamber.

Preferably, the multi-part kinematic mechanism comprises a global kinematic mechanism in a two-axis Cartesian system in a horizontal plane and a regional kinematic mechanism attached to the global kinematic mechanism implementing the regional motion of an impact turbine mounted on a regional kinematic mechanism, wherein the multi-part kinematic mechanism provides an impact turbine with at least four degrees of freedom.

Preferably, the regional kinematic mechanism comprises a telescopic assembly for moving the impact turbine in a vertical direction and a rotating mechanism for rotating the telescopic assembly about a vertical axis, the regional kinematic mechanism gives the impact turbine two degrees of freedom.

The global kinematic mechanism may comprise a track mounted on the housing, a running beam adapted to move along the track, and a travelling trolley adapted to move along the running beam, wherein the travelling trolley carries a regional kinematic mechanism, and the global kinematic mechanism gives the regional kinematic mechanism two degrees of freedom.

The impact turbine may be equipped with an angular change mechanism of the jet ejection comprising a control sleeve equipped with an outlet opening and a drive unit for changing the angular position of the control sleeve directing the treatment tool, wherein the treatment tool is given an additional degree of freedom relative to the impact turbine.

The multi-part kinematic mechanism can be equipped with a local mechanism in the form of a mechanism for deflecting the impact turbine relative to the horizontal axis on the arm, and thus to change the distance between the impact turbine and the vertical axis around which the telescopic assembly is rotated, so that the impact turbine and treatment tool are given additional degree of freedom.

The multi-part kinematic mechanism may be equipped with a local mechanism comprising a mechanism for controlling the angular movement of the impact turbine around the arm axis being the longitudinal axis of the arm, on which the impact turbine is mounted, so that the impact turbine and treatment tool are given an additional degree of freedom. The local mechanism allows a change the direction of the elliptical hot spot on the treated surface and thus gives the treatment tool an additional degree of freedom.

The machine is characterized in that the system for feeding the impact turbine with the abrasive comprise a global assembly and a regional assembly equipped with a gravity feeding hose located along the telescopic assembly, wherein the gravity feeding hose can comprise the upper section, the lower section and the open section with a variable length depending on the extension of the telescopic assembly. The global assembly of the feeding system may be associated with the global kinematic mechanism, and the regional assembly of the feeding system may be associated with the regional kinematic mechanism.

In the upper section of the gravity hose, the upper vertical channel of the gravity feeding hose can be attached to the upper part of the telescopic assembly, while in the lower section of the gravity hose the lower vertical channel of the gravity feeding hose can be located next to the impact turbine, wherein the upper vertical channel and the lower vertical channel are detachable and are located at a variable distance from each other depending on the position of the telescopic assembly, and the outlet from the upper vertical channel and the inlet to the lower vertical channel are located coaxially.

The upper section of the gravity hose can be equipped with an abrasive control valve.

The regional turbine feeding assembly may include an intermediate reservoir adapted to gravity feeding of the feeding hose.

The intermediate tank can be attached to the telescopic assembly and rotate with the telescopic assembly.

The global turbine feeding assembly can be equipped with a main tank, a longitudinal belt conveyor receiving the abrasive from the main tank located along the track and a transverse belt conveyor located along the running beam, wherein the running beam can be equipped with a scraper bar for dropping the abrasive from the longitudinal belt conveyor onto the transverse belt conveyor, and the travelling trolley can be equipped with a scraping bar for dropping the abrasive from the transverse belt conveyor to the intermediate tank.

The global turbine feeding assembly can be equipped with the main tank, wherein the intermediate tank can be adapted to feed the abrasive to the impact turbine with cyclic breaks and for cyclic feeding directly from the main tank.

The global turbine feeding assembly can be equipped with a main tank and a flexible pneumatic hose connected to the main tank, wherein the outlet of the flexible pneumatic hose may be directed to the intermediate tank.

The abrasive recirculation system may comprise scraper floor system (horizontal) for transport the abrasive equipped with scraper bars moving in the corridors.

The abrasive recirculation system may comprise an auxiliary lift connecting the primary tank feeding the abrasive through a control valve with a longitudinal belt conveyor.

The invention according to this application meets the current demand for solutions in the field of efficient, safe, energy-saving and automated abrasive treatment process of large-scale workpieces, for which pneumatic treatment is not sufficiently efficient or uneconomical, and treatment in existing wheel blast machines with operation of impact turbines located outside the working chamber is inefficient or even impossible. In the working space, the high-efficiency and high-energy effector (impact turbine) is moved through a trailing controlled or automatically kinematic mechanism to direct the optimal impact of the treatment tool (abrasive jet) on the treated surfaces. The machine according to the invention allows the use of an efficient effector with a fixed position of the workpiece during treatment. The impact turbine can be moved and oriented in the working chamber in any way, wherein the tool approach vector can be variable at the point of attachment, its direction and module can be changed to optimize its efficiency, to improve treatment uniformity or vice versa for selective treatment, which together provides a variety of applications or the use of the machine for large-scale workpieces with complex geometry.

Figure 2:
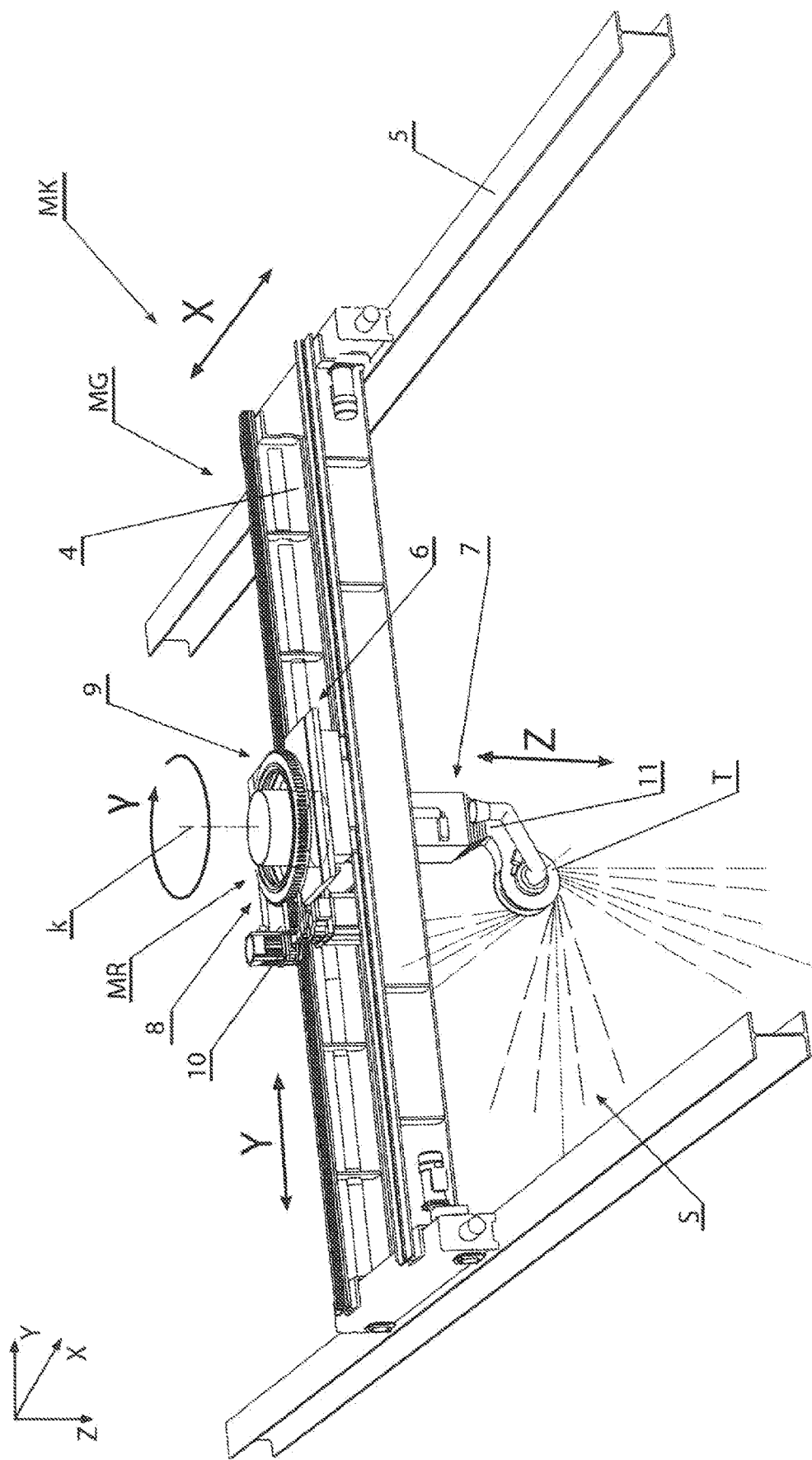
Figure 3:
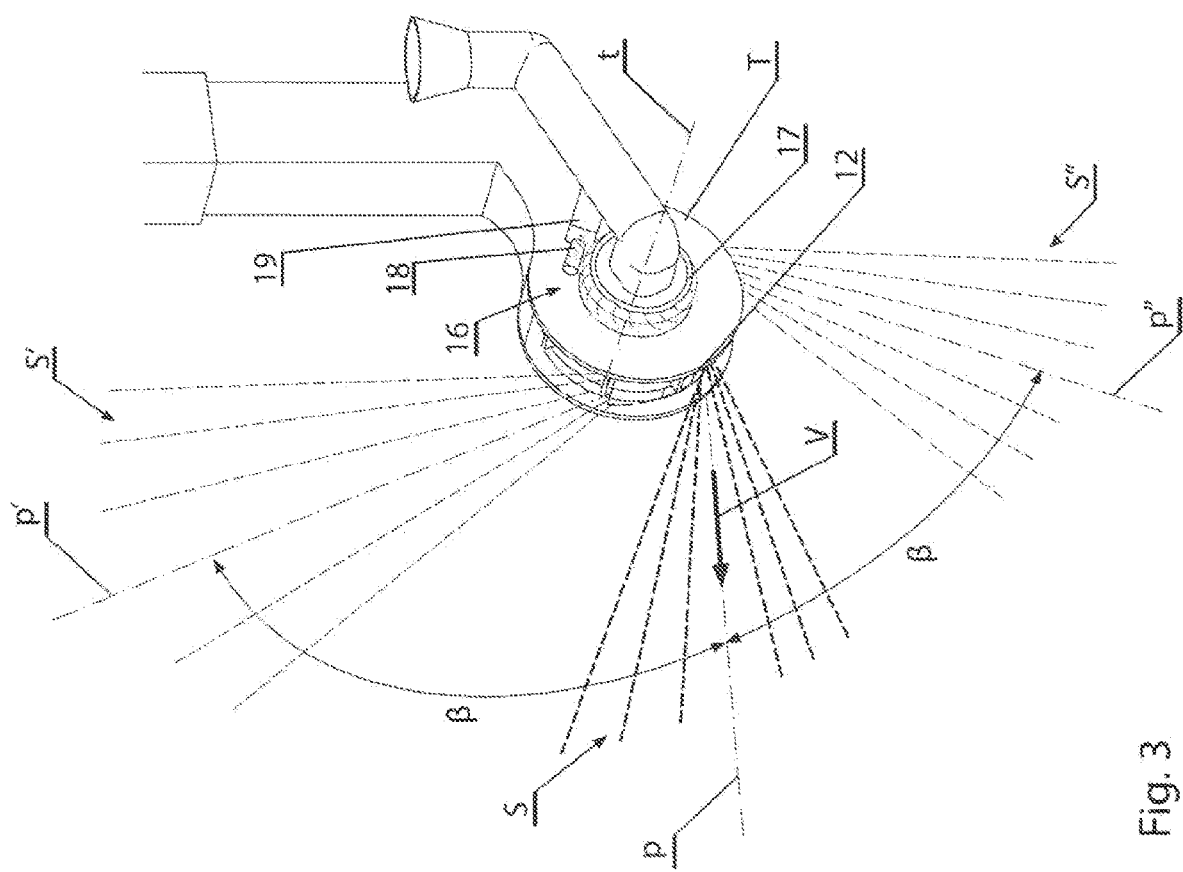
Figure 5:
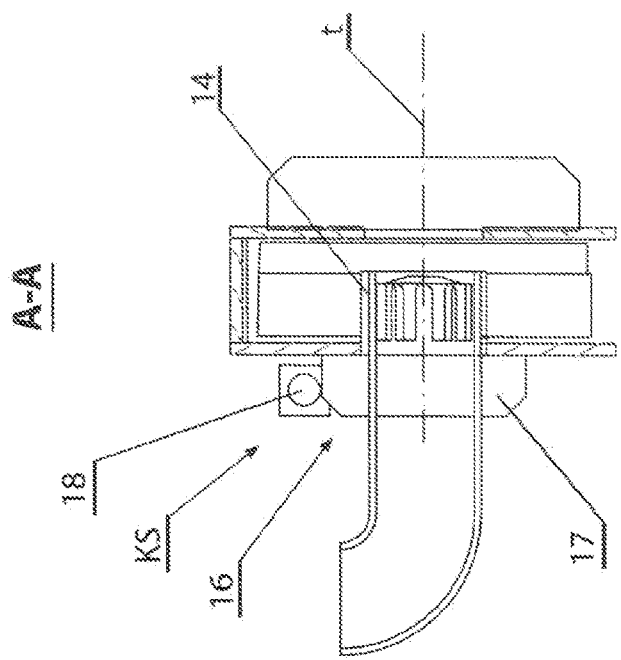
Figure 4:
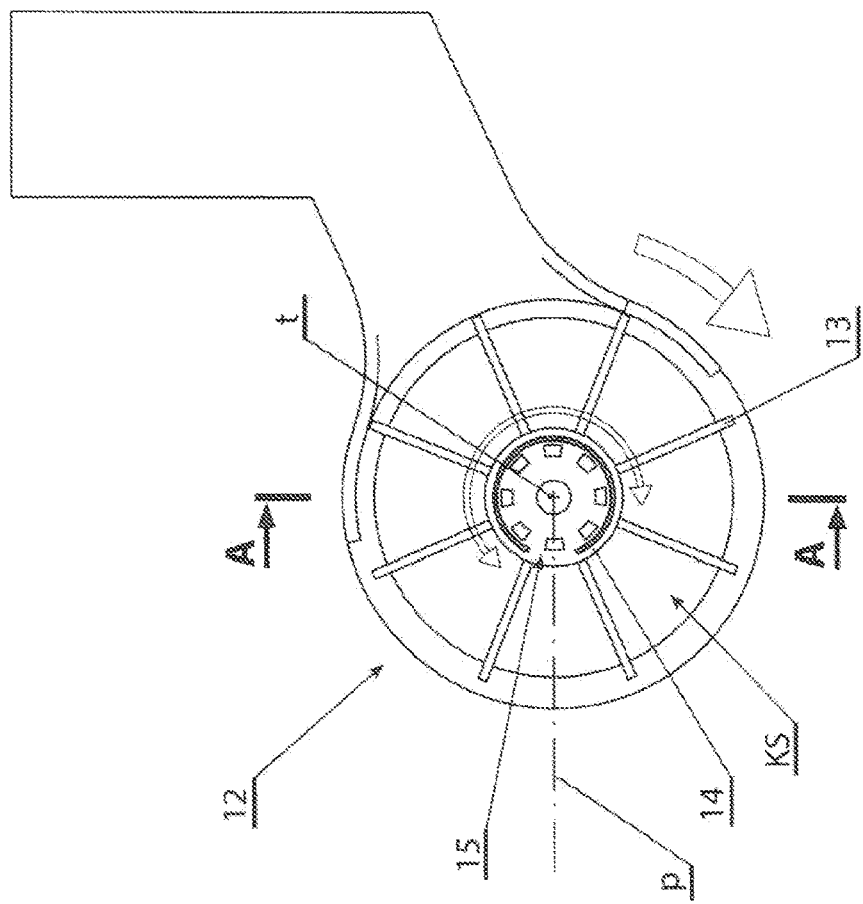
Figure 7:
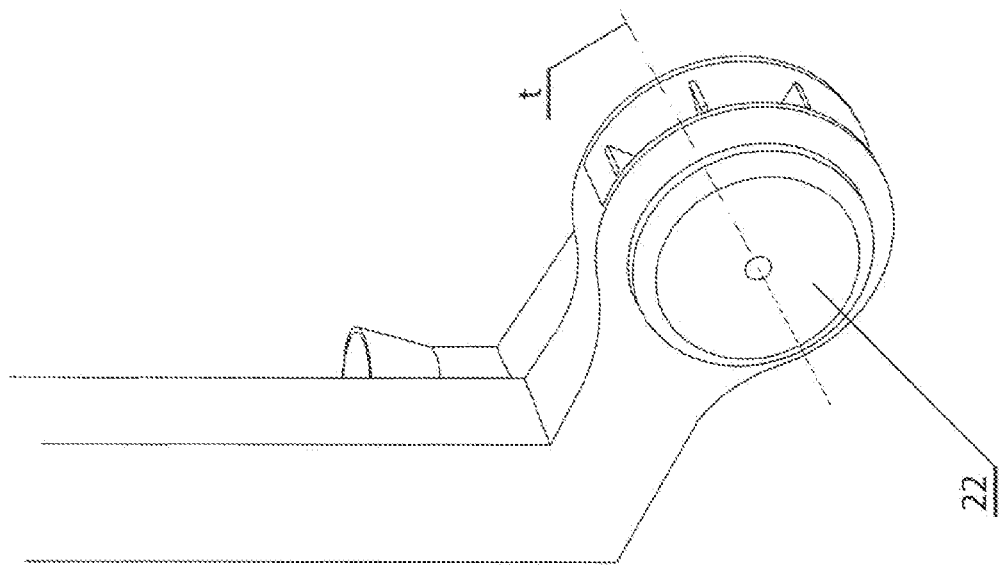
Figure 6:
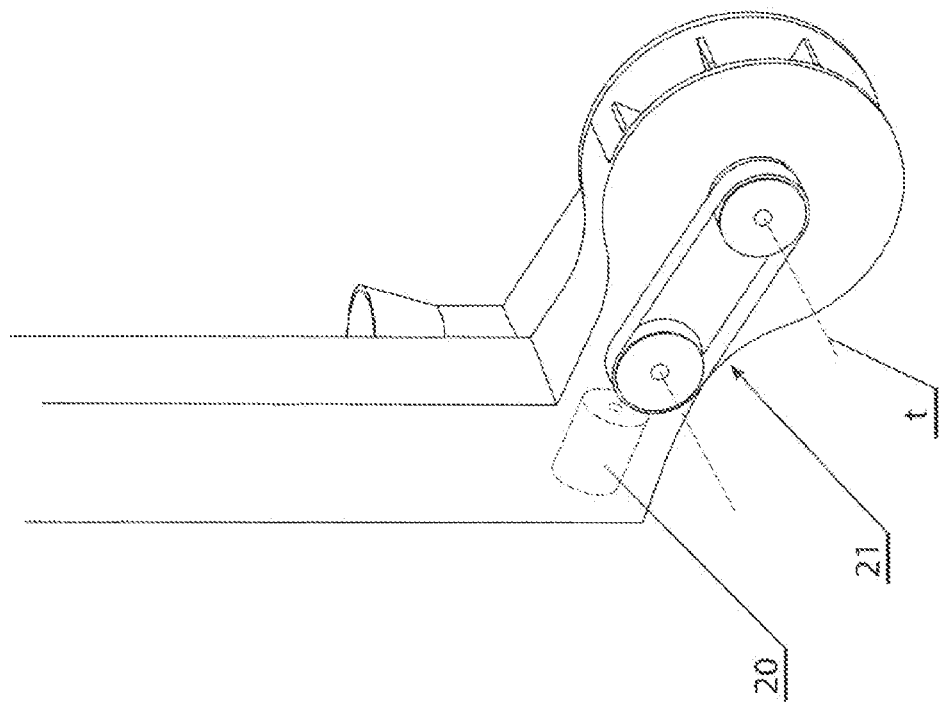
Figure 8:
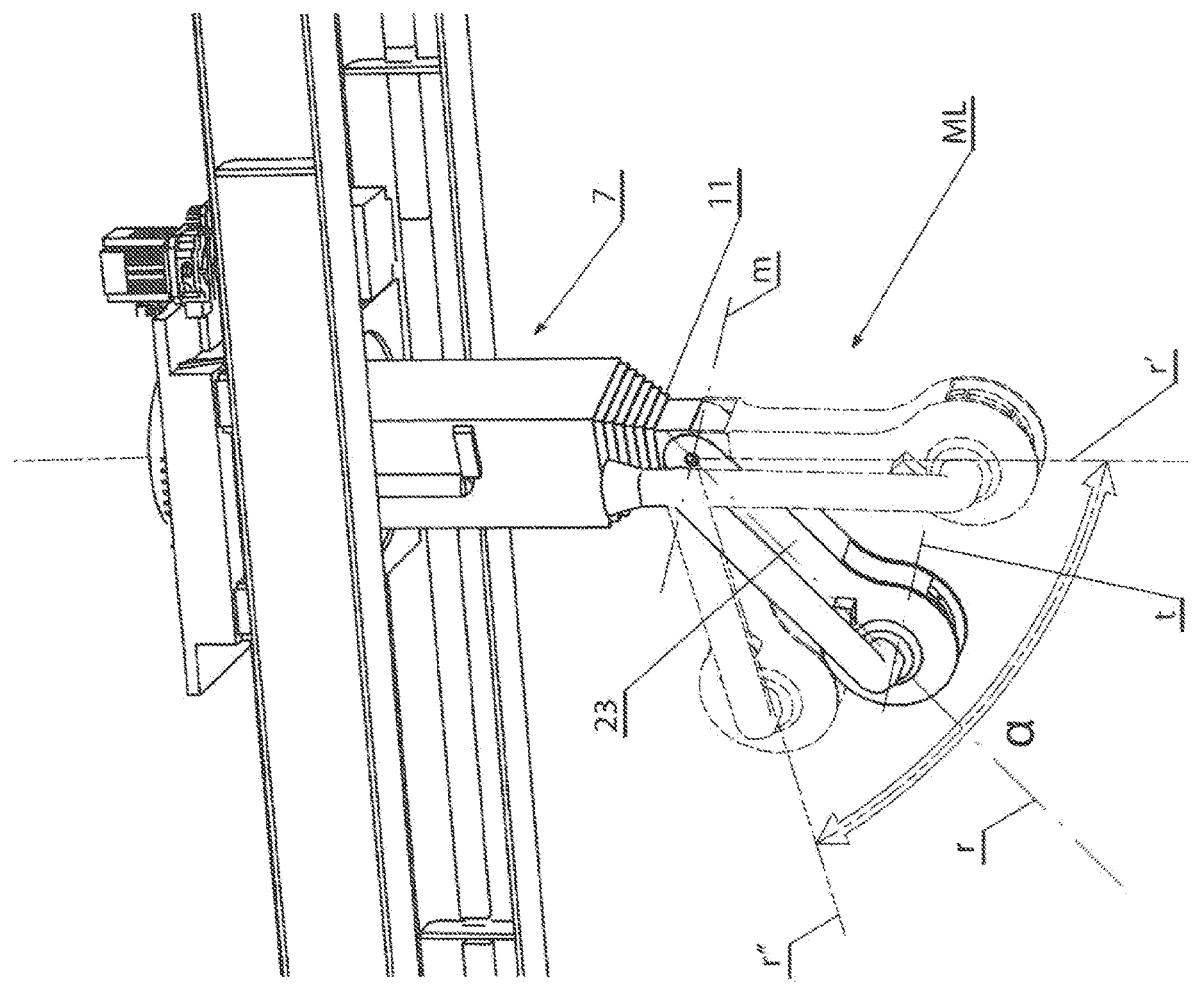
Figure 9:
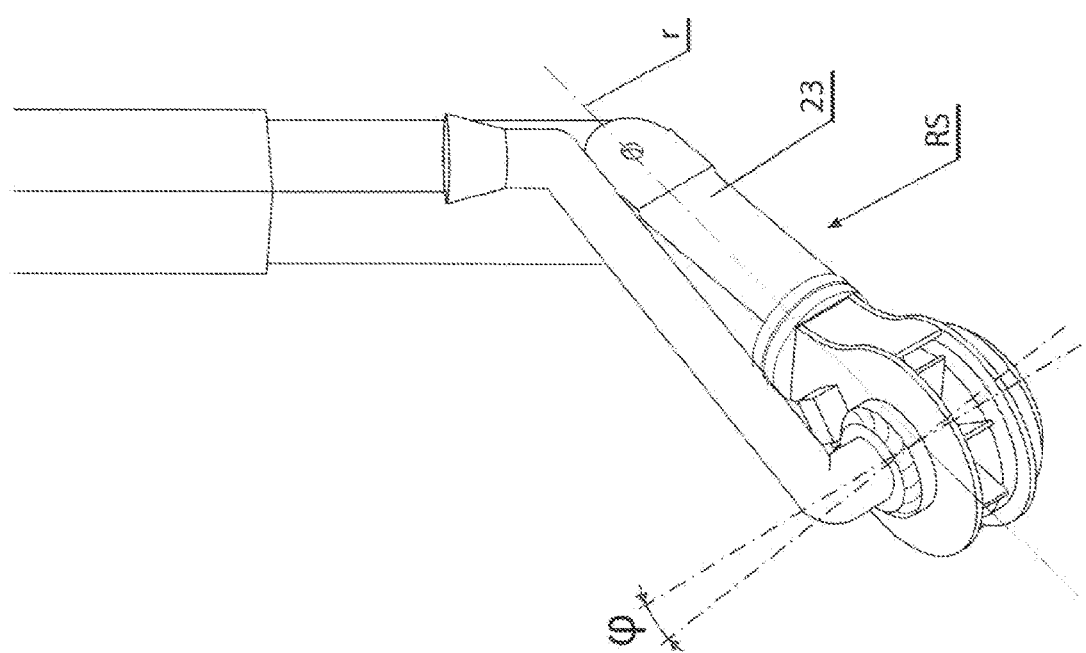
Figure 12:
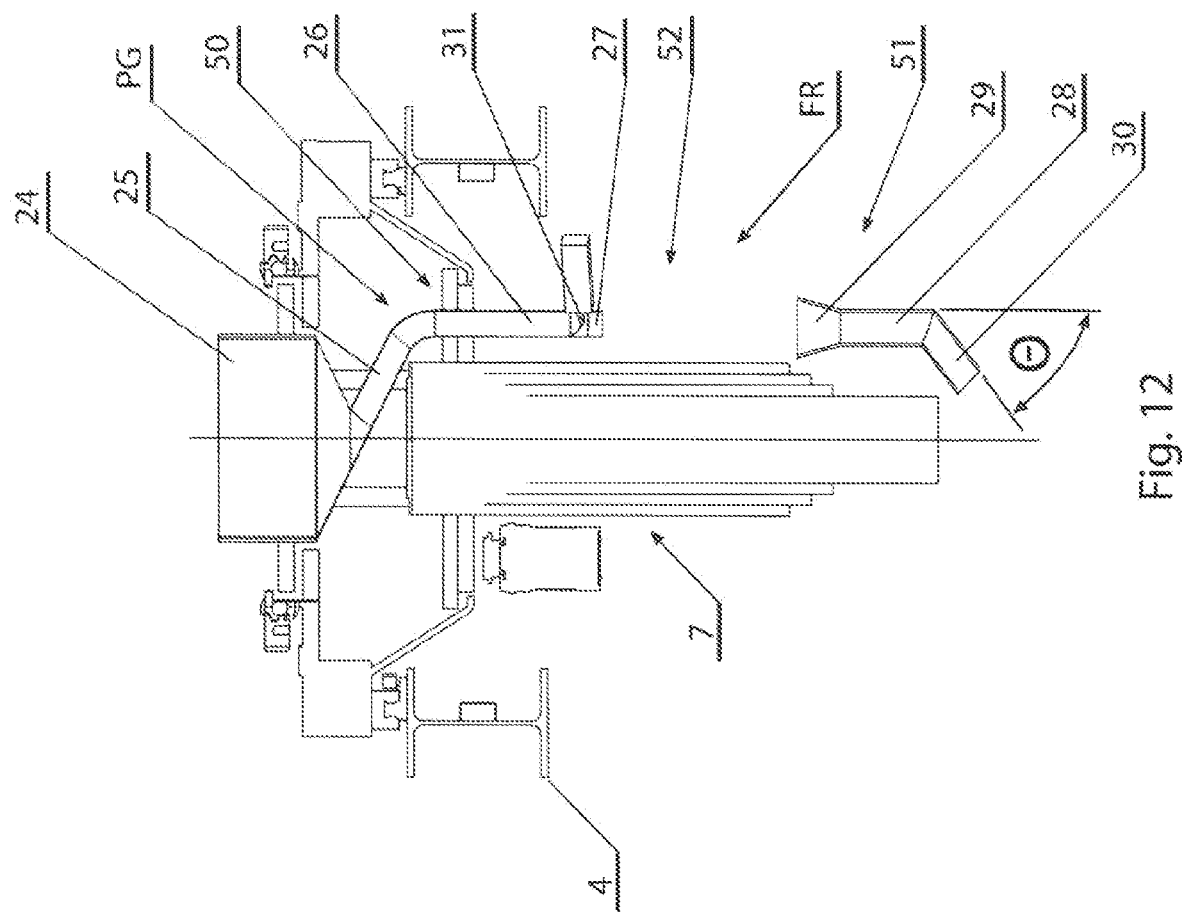
Figure 13:
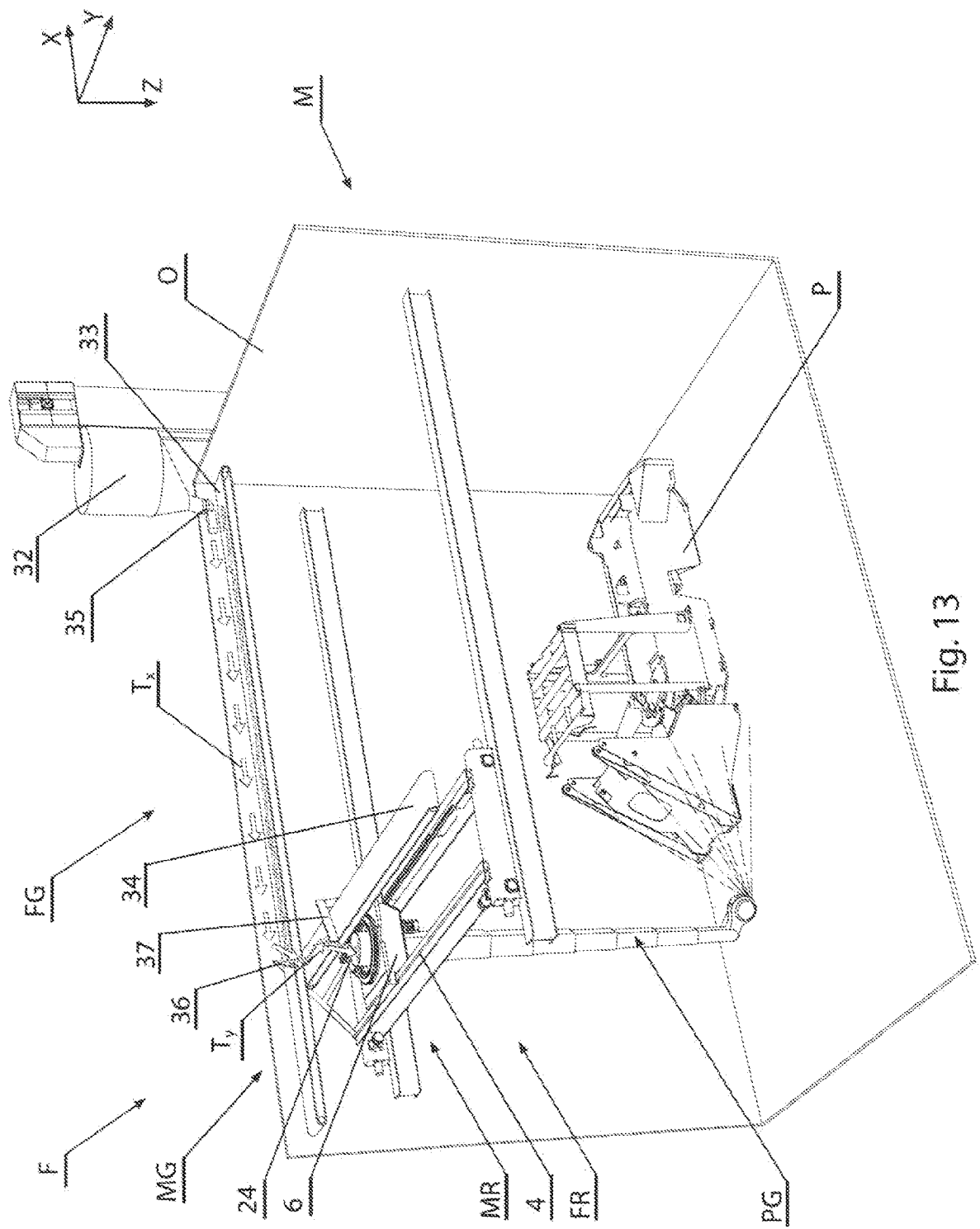
Figure 15:
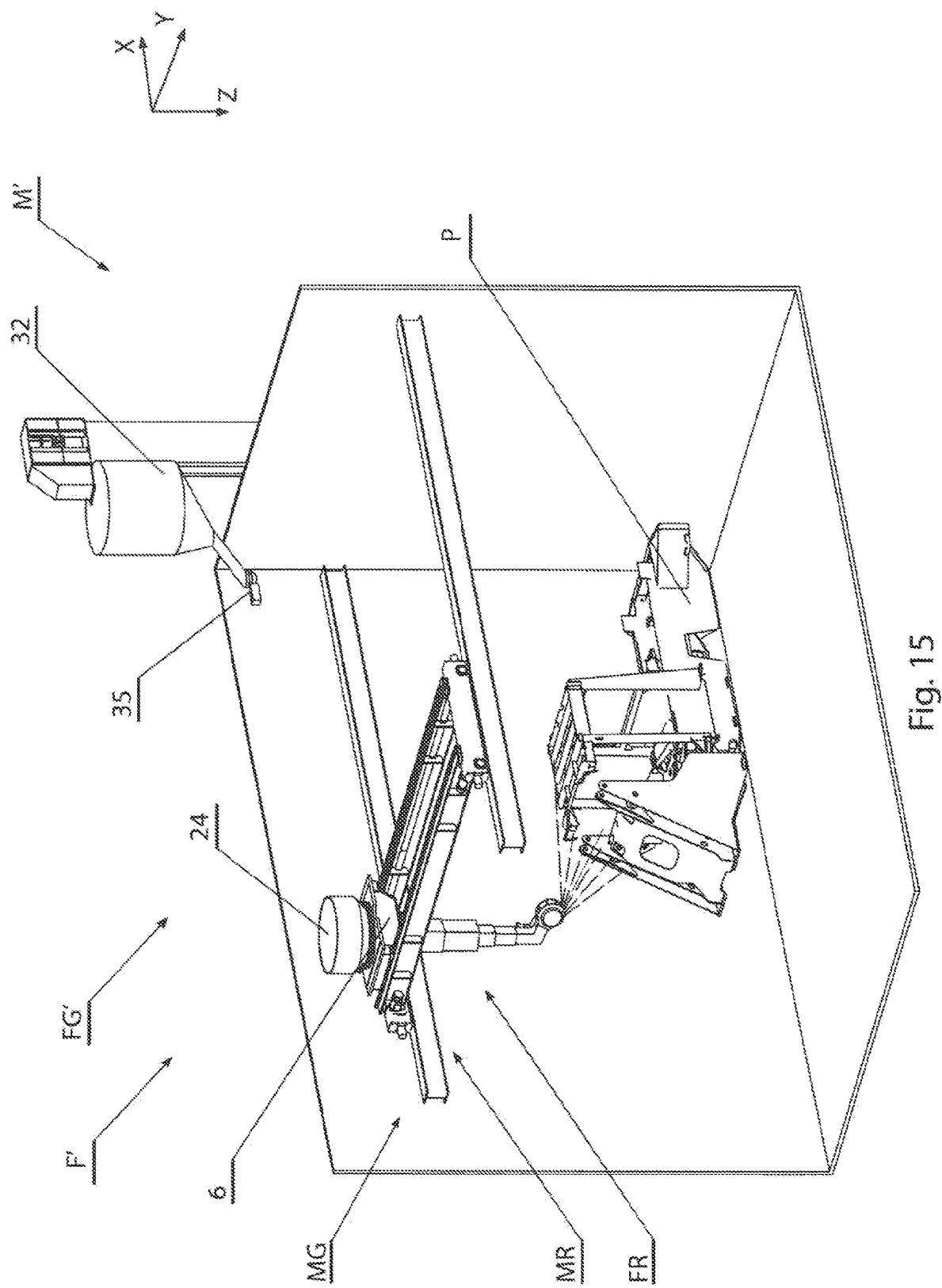
Figure 17:
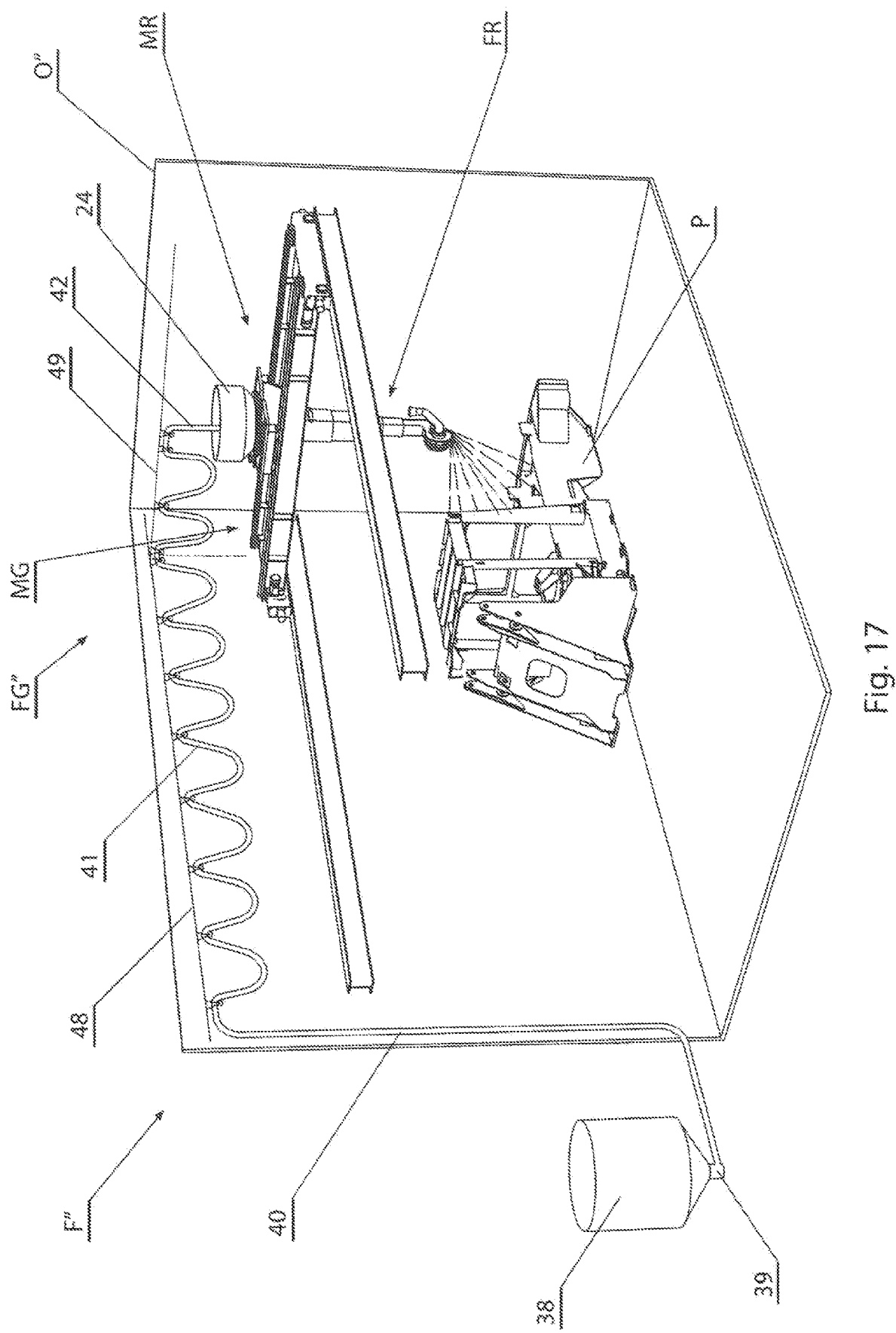
Figure 18:
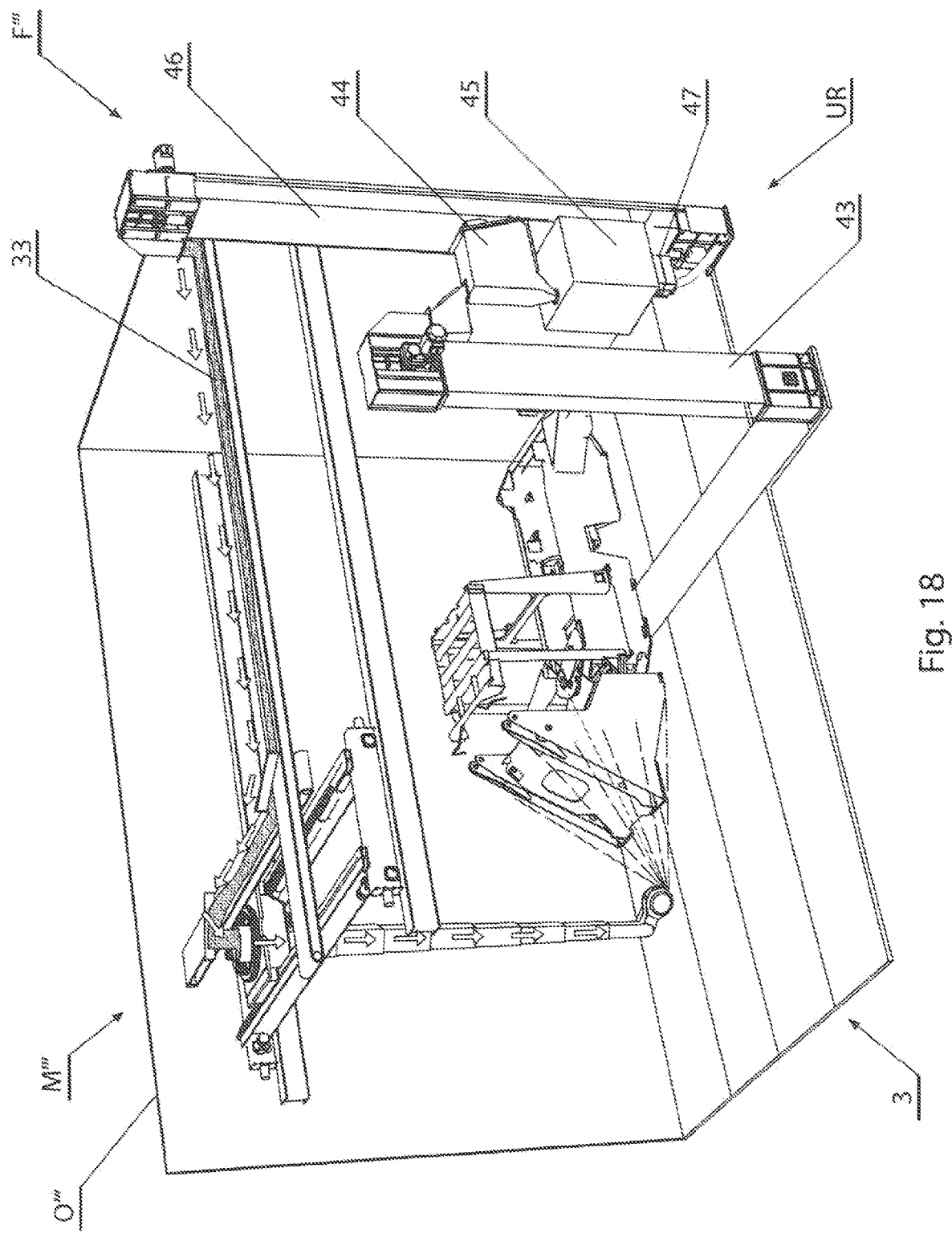

The invention has been described in more detail in the preferred embodiments illustrated in the drawing, in which:

FIG. 1 shows a machine for abrasive blast treatment of the surface of large-scale workpieces in perspective view, FIG. 2 shows the multi-part kinematic mechanism of the machine according to FIG. 1, FIG. 3 shows a perspective view of the local mechanism for angular change in the ejection of the abrasive jet from the impact turbine, FIGS. 4 and 5 shows the impact turbine in a perpendicular section to the axis and in the axial section, FIGS. 6 and 7 shows variants of the impact turbine drive units, FIG. 8 shows the local mechanism of the distance movement of the impact turbine relative to the vertical axis of the telescope, FIG. 9, 10 show a local mechanism for changing the angular position of the impact turbine in the range of 0-90° around the axis of the local attachment arm, FIG. 11 shows the regional assembly of the system for feeding the impact turbine with the abrasive, FIG. 12 shows a cross-sectional view of the regional assembly of the system for feeding the impact turbine with the abrasive, FIG. 13, 14 shows a feeding system with a global assembly with a belt conveyor variant, FIG. 15, 16 shows the feeding system with global assembly in the cyclic feeding variant, FIG. 17 shows the feeding system with the global assembly in the pneumatic feeding variant, and, FIG. 18 shows the abrasive feeding system of the impact turbine in a variant with the global belt assembly and the abrasive main tank in the lower position.

FIG. 1 shows the machine M in its basic version. The machine M comprises a housing O, which closes off the space constituting the working chamber and in which the treatment of surfaces of the workpieces with use of the abrasive takes place, while, for clarity, the machine has been shown without a side wall. Usually the front or rear wall is provided with access gates 1, through which the workpieces are delivered to the working chamber. In addition, the machine is provided with a typical filter ventilation system (FS), which ensures dedusting of the working space. The machine can be provided with any known filtering and ventilation units adapted to dusts generated during abrasive blasting treatment. The working chamber is equipped with light sources 2. The machine comprises the abrasive recirculation system UR. The recirculation system UR comprises a scraper floor system 3 for transport the abrasive, known for example from the patent application P402365, however any known scraper floor system for transport the abrasive can be used in the Machine. The abrasive recirculation system also performs the role of cleaning the abrasive by classification, removing large fractions generated during treatment (foreign bodies) and fine fractions (dusts) formed during the treatment process including abrasive wear.

FIG. 1 shows an exemplary workpiece P to be treated. The shown workpiece P is a large-scale workpiece, i.e., each of the three geometrical dimensions of which is over 1000 mm, while the machine can be used for workpieces of any size. Workpiece P is positioned in such a way, that the kinematic mechanism enables the treatment tool to reach the surfaces to be treated, as well as the kinematic mechanism is designed for the needs of treatment of specific workpieces.

According to the invention, the machine comprises an effector in the form of an impact turbine T producing a treatment tool in the form of an abrasive jet S. The impact turbine T is moved by means of the multi-part kinematic mechanism MK connected to a control system CS, wherein the global kinematic mechanism MG and the regional kinematic mechanism MR can be distinguished. The global kinematic mechanism MG is used to implement locomotion movement that enables the movement of the regional kinematic mechanism MR, while the regional kinematic mechanism MR enables the positioning and orientation of the impact turbine T in space. The kinematic parts of the global kinematic mechanism MG and the kinematic parts of the regional kinematic mechanism MR together form the multi-part kinematic mechanism MK. Such a multi-part kinematic mechanism MK has a supporting structure K, which can also be a built-in structure (sheathing and gate) of the working chamber, in which abrasive blast treatment is carried out (FIG. 1). The global kinematic mechanism MG comprises a running beam 4 moveably mounted along the track 5 for making movement in the X direction and a traveling trolley 6 mounted moveably on the running beam 4 for making movement in the Y direction. In the embodiment shown, the global kinematic mechanism MG moves the regional kinematic mechanism MR in the Cartesian plane, i.e. in two axes X and Y (plane substantially parallel to the ground). The global kinematic mechanism MG provides two degrees of freedom for the regional kinematic mechanism MR mounted on it. In the embodiment shown, the track 5, running beam 4 and traveling trolley 6 are in the form of a gantry crane, but the drive units are not shown in the drawing.

The regional kinematic mechanism MR allows the height and orientation of the impact turbine T to be changed. In the embodiment shown, the regional kinematic mechanism MR is mounted on the travelling trolley 6. The regional kinematic mechanism MR comprises a telescopic assembly 7 (FIG. 2) and a rotating assembly 8 on which the telescopic assembly 7 is mounted. The rotating assembly 8 serves to rotate the telescopic assembly 7, with the gear 9 driven by the motor 10 being used to implement the rotary movement. The impact turbine T is attached to the part 11 of the telescopic assembly 7. The rotatably mounted telescopic assembly 7 allows the impact turbine T to be moved in the Z axis, in the embodiment shown the impact turbine T can rotate by an angle γ in the range +180° to −180°, i.e. in a full angle. The rotatably mounted telescopic assembly 7 allows the impact turbine T to move, i.e., movement leading the impact turbine T to the workpiece P surfaces to be treated, thus the regional kinematic mechanism MR gives the impact turbine T two degrees of freedom. Thanks to the multi-part kinematic mechanism MK comprising the global kinematic mechanism MG and the regional kinematic mechanism MR, the impact turbine T can move in a three-dimensional X, Y, Z coordinate system and rotate around a vertical axis, and thus, together, the multi-part kinematic mechanism MK gives the impact turbine T four degrees of freedom, i.e. the multi-part kinematic mechanism MK is a four-axis mechanism.

The impact turbine T can be equipped with a controlled mechanism for changing the angle of the treatment tool for a fixed position of the impact turbine T, thanks to which the treatment tool has an additional degree of freedom. In addition, the effector may have a controlled mechanism for changing the intensity and shape of the treatment tool.

The abrasive jet S produced by the impact turbine T is shown in FIG. 3 as the angular range of the abrasive grain vectors ejected by the impact wheel 12 having sufficient energy to affect the treated surfaces. In the further part of the description, it was assumed that the direction of the treatment tool described by the axis p coincides with the sum vector of grains velocity of the abrasive jet ejected by the turbine in a specific working position. The p-axis shows the speed vector V for abrasive grains exiting from the impact wheel 12 of the impact turbine T. The impact turbine T allows a change in the feed direction of the abrasive jet S, i.e. an angular change in the treatment tool S, without changing the position of the turbine itself. In the impact turbine T, the jet of abrasive S is generated by means of the rotating impact wheel 12 with blades 13 (FIG. 4) rotating about the axis t. Changing the direction of the abrasive jet S described by axis p is carried out by means of the mechanism KS of changing the direction of jet S. The mechanism KS of changing the direction of the jet S comprises a rotatably mounted control sleeve 14 having an outlet 15 opening through which the abrasive is ejected (FIGS. 4 and 5). The position of the control sleeve 14 is changed by means of a gear 16 comprises a worm wheel 17 cooperating with a worm 18 driven by a motor 19 (FIG. 3). The impact turbine T and the jet S direction change mechanism KS is shown in section A-A in FIG. 5. The jet S direction change mechanism KS can be equipped with any other drive unit. The abrasive jet S can be directed upwards (rotated clockwise in FIG. 3) or downwards (anti-clockwise) by rotating the control sleeve 14 around the axis t by means of a gear 16. FIG. 3 shows in thick lines the abrasive jet S for the control sleeve 14 in the intermediate position and thin lines two positions of the abrasive jet S', S" after the rotation of the control sleeve 14 in two extreme positions. The p' axis represents the maximum increase of the abrasive jet S' up by an angle β of about 50° in relation to the intermediate position of the abrasive jet S described by the axis p. The p" axis represents the maximum lowering down of the abrasive jet S" by an angle β of about 50° relative to the intermediate position of the abrasive jet S. The jet S direction change mechanism KS causes a change in the direction of the abrasive jet S speed vector, i.e. it gives this jet S a degree of freedom—rotation around the axis t. The angular position change mechanism KS of the control sleeve 14 gives the abrasive jet a degree of freedom without having to change the position of the turbine. The abrasive jet S has five degrees of freedom given by the multi-part kinematic mechanism MK and the direction change mechanism KS. The use of the abrasive jet S direction change mechanism KS allows changing the angle of the velocity vector V of the treatment tool in relation to the axis of rotation t of the rotating disk without involving a regional kinematic mechanism. A wide range of changing the intensity of the treatment tool is obtained by changing the rotational speed of the impact wheel 12. By changing the tool orientation, it is possible to control the turbine in such a way, as to avoid collision between the turbine and the telescopic assembly with the workpiece.

The impact turbine T is rotated around the t axis by means of a transmission gear. In the embodiment shown in FIG. 6, the impact turbine T is driven by a motor 20 via a belt transmission 21 (transmission of the drive from the engine to the belt transmission 21 is not shown). In the embodiment shown in FIG. 7, the impact turbine T is driven by a motor 22 located on the t axis.

The multi-part kinematic mechanism MK of an abrasive blast treatment machine comprising the global kinematic mechanism MG and the regional kinematic mechanism MR may be additionally equipped with a local kinematic mechanism ML mounted on the regional kinematic mechanism MR. In the embodiment shown in FIG. 8, the local kinematic mechanism ML is in the form of a mechanism for deflecting the impact turbine T and includes a rotating arm 23 mounted on a substantially horizontal m axis to the lowest part 11 of the telescopic assembly 7, wherein for simplicity the drive of rotational mechanism has not been shown. The drive mechanism can be hidden inside the arm 23. The impact turbine T is mounted at the end of the arm 23, wherein the conventional axis of the arm 23, designated as r, passes through the rotational t axis of the impact turbine T and through the rotational m axis of the rotational arm. By rotation, the arm 23 can be directed vertically downwards, which position is described by r' axis. The arm can be rotated upwards from the r' axis to the r" axis by an angle α of about 90°. The local kinematic mechanism ML allows the impact turbine T to be moved away from the axis of the telescope belonging to the regional kinematic mechanism MR. The local kinematic mechanism causes a change in the angular position of the arm 23 relative to the horizontal plane. The local kinematic mechanism ML gives the impact turbine T an additional degree of freedom—rotation around the m axis. Thus, the impact turbine T has five degrees of freedom given by the multi-part kinematic mechanism MK and the local kinematic mechanism ML. By using the jet S direction change mechanism KS, the treatment tool has six degrees of freedom.

Figure 10:
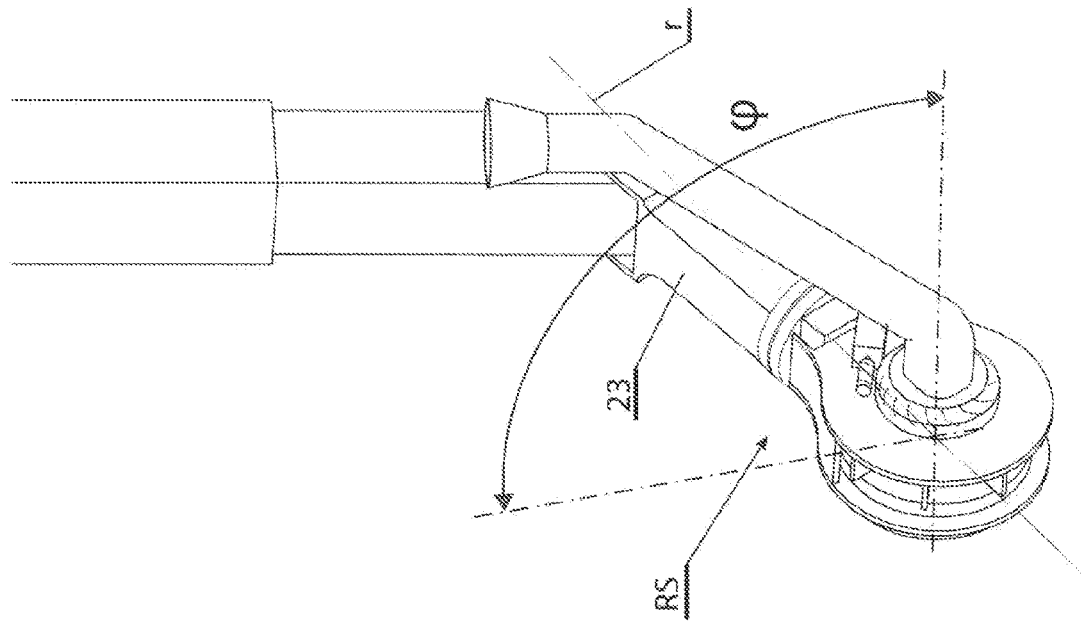

FIGS. 9 and 10 show a local mechanism RS for controlling the angular movement of the impact turbine T about the r axis being the longitudinal axis of the arm 23 on which the impact turbine T is mounted. Any known mechanism hidden in the arm 23 can be used to perform this movement. The torsional movement mechanism RS of the impact turbine T allows the rotation of the impact turbine T by an angle qp in the range from 0° to 90°, and thus the rotation of the abrasive jet S around the r axis. Thus, the torsional movement mechanism RS of the impact turbine T gives the treatment tool S an additional degree of freedom.

The impact turbine T can therefore direct the abrasive jet both from the side to the workpiece as well as from below and above. The impact turbine T can perform more complex local movements, for example inside the workpieces.

The feeding system F for feeding the impact turbine T with the abrasive comprises the global feeding assembly FG, hereinafter the global assembly FG and the regional feeding assembly FR, hereinafter the regional assembly FR. The global assembly FG is associated with the global kinematic mechanism MG and feed the abrasive to the regional assembly FR associated with the regional kinematic mechanism MR. Embodiments of the feeding system F will be discussed later in the description.

The regional assembly FR of feeding the impact turbine T comprises an intermediate tank 24 located on the telescopic assembly 7 (FIG. 11). The intermediate tank 24 is attached to the top of the telescopic assembly 7 and rotates with it. The intermediate tank 24 is open from above and is adapted to be filled from above by the global assembly FG. The intermediate tank 24 can have any shape, in the embodiment shown the intermediate tank 24 is cylindrical. In the embodiment shown in FIG. 12, the regional assembly FR comprises a gravity feeding hose PG that feeds the abrasive to the impact turbine T. The gravity feed hose PG comprises the upper section 50 and the lower section 51. The upper section 50 includes an upper sloping channel 25 directly connected to the intermediate tank 24, an upper vertical channel 26 connected to the upper sloping channel 25, wherein the upper vertical channel 26 has an outlet 27. The lower section 51 includes a lower vertical channel 28 having an inlet 29 and a lower inclined channel 30 connected to the lower vertical channel 28, wherein the lower inclined channel 30 is located at the impact turbine T and feeds the abrasive to the impact turbine T. Between the outlet 27 from the upper section 50 and the inlet 29 to the lower section 51 there is an open section 52 of variable length. The gravity feed hose PG can be equipped with an abrasive control valve 31 located above the outlet 27 from the vertical channel 26. The abrasive valve can also be located directly by the tank 24. The tank 24 and the gravity feed hose PG rotate together with the telescopic assembly 7, wherein in the extended position of the telescopic assembly 7 the lower vertical channel 28 together with the inclined lower channel 30 move away from the upper vertical channel 26. The lower inclined channel 30 can be attached to the lowest element 11 of the telescopic assembly 7. The upper vertical channel 26 and the upper inclined channel 25 can be mounted on the travelling trolley 6. The outlet 27 of the upper vertical channel 26 and the inlet 29 of the lower vertical channel 28 are arranged coaxially with each other, the outlet 27 may be made in the form of a (tapering) cone, while the inlet 29 may be made in the form of a (expanding) cone. The upper vertical channel 26 and the lower vertical channel 28, and thus the outlet 27 and the inlet 29 change the distance from each other depending on the position of the telescopic assembly, i.e. from the degree of extension of the movable elements of the telescopic assembly 7. In FIG. 2 the impact turbine T is in the highest position, and the outlet 27 and the inlet 29 are pushed together at a minimum distance. In FIGS. 1 and 11, outlet 27 and inlet 29 are moved as far as possible. During machine operation, the abrasive flies out of the upper vertical channel 26 through the outlet 27 and falls in the air by gravity through the open section 52 without any guidance, and finally falls into the inlet 29 of the lower vertical channel 28. The abrasive that flows into the lower vertical channel 28 falls further into the lower inclined channel 30 and then into the impact turbine T. The inclined lower channel 30 is inclined by an angle ⊖ of at least 30°, preferably by an angle of 350 in relation to the vertical channel 28, which enables the abrasive to be poured directly into the impact turbine T.

The global feeding assembly FG of the impact turbine feeds the abrasive to the intermediate tank 24, which is a compensation buffer for the movements of the global kinematic mechanism MG.

Figure 14:
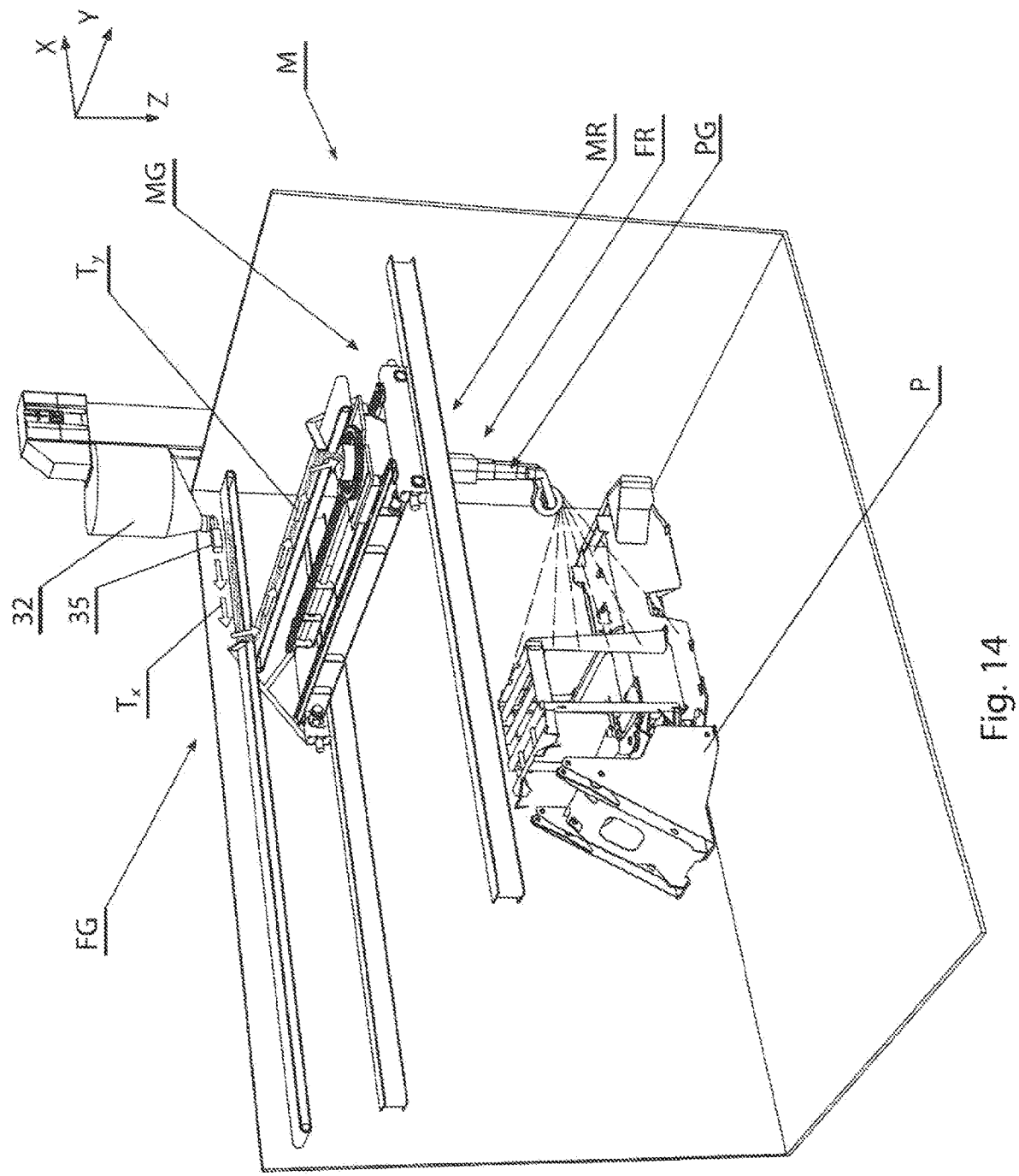

In the embodiment of Machine M shown in FIGS. 13 and 14, the feeding system F for feeding the impact turbine T with the abrasive, comprises the global assembly FG and the regional assembly FR as discussed above. The global assembly FG comprise the main tank 32, the longitudinal belt conveyor 33 located along the housing wall O and the transverse belt conveyor 34 located along the running beam 4, wherein the conveyors 33 and 34 being adapted to feed the abrasive from the main tank 32 to the intermediate tank 24 located on the telescopic assembly 7 in the regional assembly FR for feeding the impact turbine. The abrasive is fed from the main tank 32 through the hopper ended with the control valve 35 to the longitudinal belt conveyor 33. The running beam 4 is equipped with a scraper bar 36, by means of which the abrasive is redirected from the longitudinal belt conveyor 33 to the transverse belt conveyor 34. The travelling trolley 6 is equipped with a scraper bar 37, by means of which the abrasive is redirected from the transverse belt conveyor 34 to the intermediate tank 24. The feed of the abrasive to the intermediate tank 24 takes place in a way that allows the turbine to work without interruptions, considering the momentary changes in the demand for the abrasive. The abrasive is moved along the longitudinal belt conveyor 33 along the track Tx, and then along the transverse belt conveyor 34 along the track Ty. An exemplary location of the regional kinematic mechanism MR is shown in FIG. 13. In FIG. 14 a different location of the regional kinematic mechanism MR is shown, the abrasive being moved along the shorter track Tx and along the extended track Ty, furthermore the gravity feed hose PG has been shortened. The movement of the abrasive along the Tx and Ty tracks is synchronized with the reception intensity by the regional assembly FR and the location and direction of the global kinematic mechanism movement MG.

Figure 16:
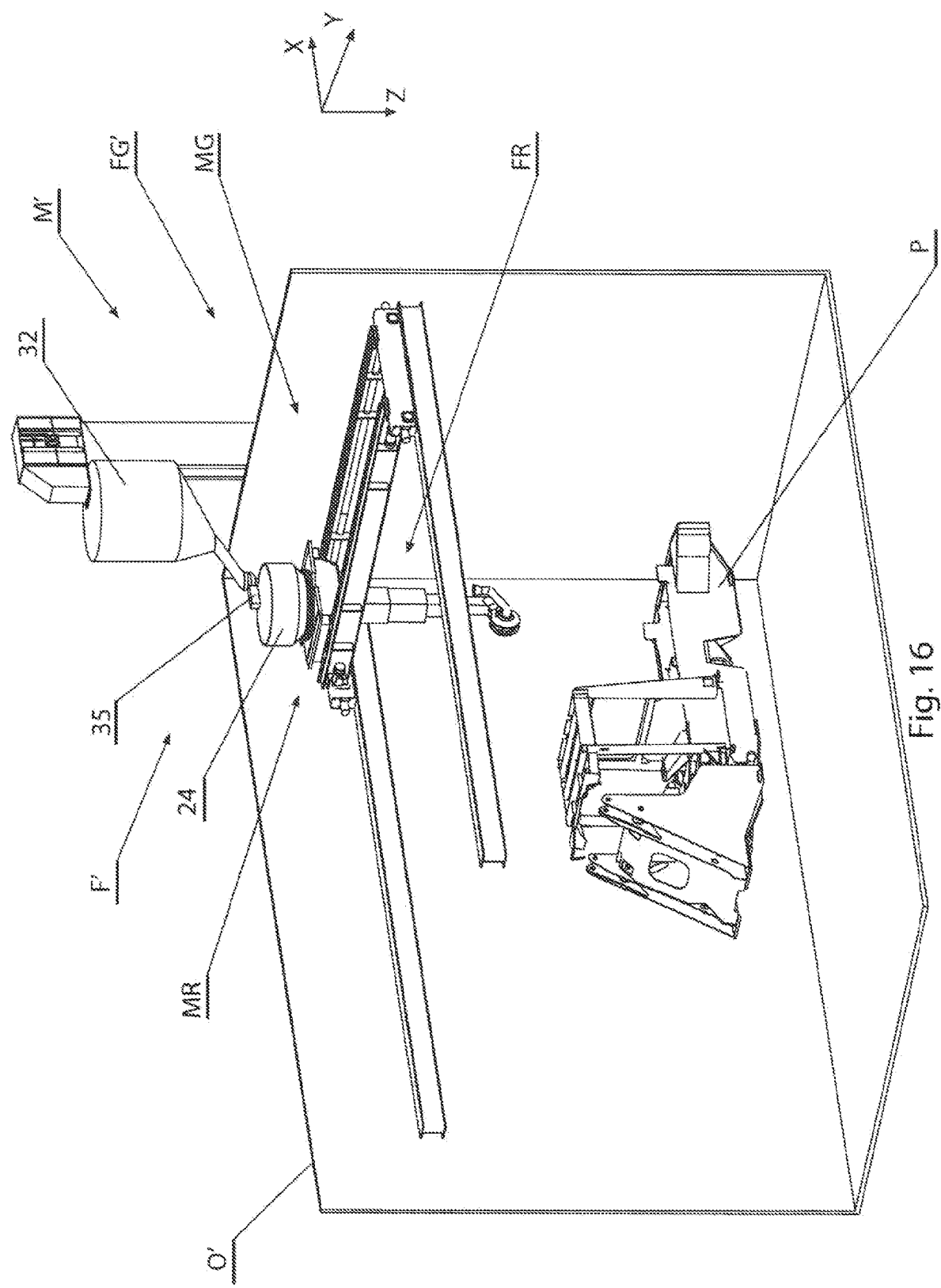

In the embodiment of Machine M' shown in FIGS. 15 and 16 the feeding system F' for feeding the impact turbine T with the abrasive, comprises the global assembly FG' and the regional assembly FR as discussed above. The global assembly FG' comprise a main tank 32. Refilling the intermediate tank 24 in regional assembly FR from main tank 32 takes place in a cyclical manner. FIG. 15 shows the global kinematic mechanism MG and the global assembly FG' for feeding the impact turbine in an exemplary operating position, i.e. during treatment of the workpiece P. The regional assembly FR and the impact turbine T operate autonomously, wherein the length of the impact turbine T operating cycle is dependent on the required abrasive feed capacity during treatment and the capacity of the intermediate tank 24. After the amount of abrasive accumulated in the intermediate tank 24 has been used up, the treatment is interrupted to fill the intermediate tank 24. FIG. 16 shows the global kinematic mechanism MG in the filling position, in which the abrasive is feed from the main tank 32 via a hopper ended with a control valve 35 to the intermediate tank 24.

In the embodiment of Machine M" shown in FIG. 17 the feeding system F" for feeding the impact turbine T with the abrasive, comprises the global assembly FG" and the regional assembly FR as discussed above. The global assembly FG" comprise a main tank 38 and flexible pneumatic hose 41. The outlet 39 of the main tank 38 is connected by a hose 40 to the flexible pneumatic hose 41, the outlet 42 of the flexible pneumatic hose 41 is directed directly to the intermediate tank 24 in the regional assembly FR. Refilling the intermediate tank 24 is continuous. The flexible pneumatic hose 41 is adapted to efficiently feed the abrasive in the entire range of motion performed by the global kinematic mechanism MG. The flexible pneumatic hose 41 is suspended on rails 48, 49 so as to form a zigzag line, wherein the flexible pneumatic hose 41 extends along the wall of the housing O" and along the running beam 4.

In the embodiment shown in FIG. 18, the machine M''' is provided with a feeding system F''' including an abrasive recirculation system UR, which includes a scraper floor system 3 for transport the abrasive, gravity lift 43, abrasive separator 44 and main tank 45. In separator 44, the abrasive is subjected to cleaning and classification to separate the impurities and the fraction of the unusable abrasive by shape or size. Foreign bodies formed during treatment can be separated on the platform trusses or on the sieve system cleaned manually or automatically, through a vibrating or rotating sieve. In the embodiment shown, an auxiliary lift 46 is used to connect the main tank 45 feeding the abrasive through the control valve 47 to the longitudinal belt conveyor 33, so that it is possible to locate the separator 44 and the main tank 45 with the valve at a lower level and lowering down the machine. The feeding system F''' used is adapted to be fed with abrasive continuously.

The machine M may be provided with one or more parallel abrasive transport corridors as disclosed in P402365 and with transverse abrasive transport corridors. The abrasive transport corridor is preferably located in the floor. Horizontal, floor, abrasive transport preferably takes place by means of a scraper system operating with reciprocating movement.

As part of the implementation of the invention, it is also possible to use other abrasive recirculation systems.

To control the motion of the impact turbine, it is necessary to control the individual parts of the multi-part kinematic mechanism. For this purpose, a programmable controller available on the market can be used, which performs tasks of simple and inverse kinematics, with servo drivers of mechanism parts. The controller enables the implementation of its own kinematic chains using these modules to control the central point of the tool (TCP), i.e. turbines and calculate the position of each axis of the system. In the knowledge of the skilled person, adjustment of commercially available control and monitoring systems of the device system according to the invention will be adaptable, e.g. SEW-EURO-DRIVES in the form of the "MultiMotion" Motion Control platform with the additional "Kinematics" technology module.

We claim:

1. An abrasive blasting treatment machine for large-scale workpiece surfaces, the machine comprising:
   a housing constituting a working chamber;
   an effector within said working chamber, said effector being comprised of an impact turbine so as to produce a treatment tool configured to treat the workpiece;
   a multi-part kinematic mechanism for moving said effector;
   an abrasive recirculation system connected to the housing;
   an effector feeding system with recirculated abrasive from the abrasive recirculation system and connected to the effector;
   a filtration system of the working chamber; and a control system connected to the multi-part kinematic mechanism,
wherein the multi-part kinematic mechanism has at least four axes,
wherein the multi-part kinematic mechanism comprises:
a global kinematic mechanism having a horizontal plane in a two-axis Cartesian system; and
a regional kinematic mechanism being attached to the global kinematic mechanism,
wherein said impact turbine is mounted on the regional kinematic mechanism so as to implement regional motion of said impact turbine,
wherein the multi-part kinematic mechanism provides said impact turbine with at least four degrees of freedom,
wherein the regional kinematic mechanism comprises:
a telescopic assembly having a vertical axis and being connected to said impact turbine so as to move said impact turbine in a vertical direction; and
a rotating mechanism for said telescopic assembly about the vertical axis, and
wherein said impact turbine has two degrees of freedom according to the regional kinematic mechanism.

2. The machine, according to claim 1, wherein the global kinematic mechanism comprises:
a track mounted on the housing,
a traveling beam in a moveable engagement along the track, and
a traveling trolley in a moveable engagement along the traveling beam,
wherein the regional kinematic mechanism is carried by the travelling trolley, and
wherein the regional kinematic mechanism has two degrees of freedom according to the global kinematic mechanism.

3. The machine, according to claim 1, wherein said treatment tool is comprised of an abrasive jet,
wherein said impact turbine is comprised of a mechanism for angular change of the abrasive jet,
wherein the mechanism for angular change is comprised of a control sleeve provided with an outlet opening, and
a drive unit connected to said control sleeve so as to change the angular position of the control sleeve, and
wherein the treatment tool has an additional degree of freedom in relation to the impact turbine according to the control sleeve.

4. The machine, according to claim 1, wherein the effector feeding system comprises:
a global assembly; and
a regional assembly having a gravity feeding hose located along the telescopic assembly,
wherein said gravity feeding hose is comprised of an upper section, a lower section, and an open section, said gravity feeding hose having a variable hose length, according to extension of said telescopic assembly.

5. The machine, according to claim 4,
wherein the upper section is comprised of an upper vertical channel attached to an upper section of telescopic assembly,
wherein the lower section is comprised of a lower vertical channel located at said impact turbine,
wherein the upper vertical channel and the lower vertical channel are detachable and are located at a variable distance from each other depending on a position of said telescopic assembly, and
wherein the upper vertical channel has an outlet coaxial with an inlet of the lower vertical channel.

6. The machine, according to claim 5, wherein the upper section is comprised of an abrasive control valve.

7. The machine, according to claim 4, wherein the regional assembly further comprises an intermediate tank in communication with said gravity feeding hose so as to feed abrasive from said intermediate tank to said gravity feeding hose.

8. The machine, according to claim 7, wherein said intermediate tank is attached to said telescopic assembly so as to be rotatable with said telescopic assembly.

9. The machine, according to claim 7, wherein said global assembly is comprised of a main tank in communication with said intermediate tank so as to feed abrasive to said impact turbine with cyclical breaks for cyclic feeding directly from said main tank.

10. The machine, according to claim 7, wherein said global assembly is comprised of a main tank, and a flexible pneumatic hose connected to said main tank, and wherein said flexible pneumatic hose has a hose outlet directed to said intermediate tank.

11. The machine, according to claim 4,
wherein the global kinematic mechanism comprises:
a track mounted on the housing,
a traveling beam in a moveable engagement along the track, and
a traveling trolley in a moveable engagement along the traveling beam,
wherein the regional kinematic mechanism is carried by the travelling trolley,
wherein the regional kinematic mechanism has two degrees of freedom according to the global kinematic mechanism,
wherein said global assembly is comprised of: a main tank, a longitudinal belt conveyor being connected to said main tank so as to receive abrasive from said main tank and being located along said track, and a transverse belt conveyor located along said traveling beam,
wherein said traveling beam is comprised of a scraper bar so as to drop abrasive from said longitudinal belt conveyor onto said transverse belt conveyor, and
wherein said travelling trolley is comprised of a trolley scraper bar so as to drop abrasive from said transverse belt conveyor to said intermediate tank.

12. The machine, according to claim 1, wherein said abrasive recirculation system comprises a scraper floor system so as to transport abrasive.

13. The machine, according to claim 1, wherein said abrasive recirculation system comprises an auxiliary lift, a control valve, and a recirculation main tank connected to said auxiliary lift so as to feed abrasive through said control valve to said effector feeding system.

14. An abrasive blasting treatment machine for large-scale workpiece surfaces, the machine comprising:
a housing constituting a working chamber;
an effector within said working chamber, said effector being comprised of an impact turbine so as to produce a treatment tool configured to treat the workpiece;
a multi-part kinematic mechanism for moving said effector;
an abrasive recirculation system connected to the housing;
an effector feeding system with recirculated abrasive from the abrasive recirculation system and connected to the effector;
a filtration system of the working chamber; and
a control system connected to the multi-part kinematic mechanism, wherein the multi-part kinematic mechanism has at least four axes,
wherein the multi-part kinematic mechanism comprises:
  a global kinematic mechanism having a horizontal plane in a two-axis Cartesian system; and
  a regional kinematic mechanism being attached to the global kinematic mechanism,
wherein said impact turbine is mounted on the regional kinematic mechanism so as to implement regional motion of said impact turbine,
wherein the multi-part kinematic mechanism provides said impact turbine with at least four degrees of freedom,
wherein the regional kinematic mechanism comprises:
  a telescopic assembly having a vertical axis and being connected to said impact turbine so as to move said impact turbine in a vertical direction; and
  a rotating mechanism for said telescopic assembly about the vertical axis, and
wherein said impact turbine has two degrees of freedom according to the regional kinematic mechanism,
wherein the multi-part kinematic mechanism is further comprised of a local mechanism for said impact turbine,
wherein the local mechanism is comprised of an arm having a horizontal axis so as to change a distance of said impact turbine from the vertical axis of said telescopic assembly, and
wherein the effector has an additional degree of freedom according said arm.

15. An abrasive blasting treatment machine for large-scale workpiece surfaces, the machine comprising:
  a housing constituting a working chamber;
  an effector within said working chamber, said effector being comprised of an impact turbine so as to produce a treatment tool configured to treat the workpiece;
  a multi-part kinematic mechanism for moving said effector;
  an abrasive recirculation system connected to the housing;
  an effector feeding system with recirculated abrasive from the abrasive recirculation system and connected to the effector;
  a filtration system of the working chamber; and
  a control system connected to the multi-part kinematic mechanism,
wherein the multi-part kinematic mechanism has at least four axes,
wherein the multi-part kinematic mechanism comprises:
  a global kinematic mechanism having a horizontal plane in a two-axis Cartesian system; and
  a regional kinematic mechanism being attached to the global kinematic mechanism,
wherein said impact turbine is mounted on the regional kinematic mechanism so as to implement regional motion of said impact turbine,
wherein the multi-part kinematic mechanism provides said impact turbine with at least four degrees of freedom,
wherein the multipart kinematic mechanism is further comprised of a local mechanism for said impact turbine,
wherein the local mechanism is comprised of an arm having an arm longitudinal axis so as to angularly control said impact turbine, and
where the effector has a further degree of freedom.

* * * * *